United States Patent [19]

Martino

[11] Patent Number: 5,765,100
[45] Date of Patent: Jun. 9, 1998

[54] COMMUNICATION DIVERSITY BY IMAGE RECEPTION

[75] Inventor: Raymond A. Martino, San Jose, Calif.

[73] Assignee: Symbol Technologies, Inc., Holtsville, N.Y.

[21] Appl. No.: 383,530

[22] Filed: Feb. 3, 1995

[51] Int. Cl.⁶ .................................................. H04B 7/02
[52] U.S. Cl. .............................. 455/59; 455/62; 455/101
[58] Field of Search .................................. 455/101, 103, 455/104, 52.3, 65, 108, 48, 59, 184.1, 197.1, 266, 54.1, 54.2, 62, 506, 517; 340/573, 539

[56] References Cited

U.S. PATENT DOCUMENTS

| | | |
|---|---|---|
| 3,942,120 | 3/1976 | Ham . |
| 4,099,126 | 7/1978 | Hallford . |
| 4,118,670 | 10/1978 | Dickens . |
| 4,193,035 | 3/1980 | Berger . |
| 4,198,605 | 4/1980 | Yamashita et al. . |
| 4,228,546 | 10/1980 | Ogita . |
| 4,255,810 | 3/1981 | Solomon et al. . |
| 4,406,019 | 9/1983 | Ide et al. ........................ 455/266 |
| 4,414,687 | 11/1983 | Hirata ........................... 455/184.1 |
| 4,872,206 | 10/1989 | Graziadei et al. . |
| 5,155,469 | 10/1992 | Hartmann et al. ............... 340/539 |
| 5,230,094 | 7/1993 | Kitching et al. . |
| 5,263,195 | 11/1993 | Panther . |
| 5,265,268 | 11/1993 | Tahim . |
| 5,321,852 | 6/1994 | Seong . |
| 5,369,800 | 11/1994 | Takagi et al. ...................... 455/59 |

OTHER PUBLICATIONS

Spragins et al., Telecommunications, Jul., 1992, pp. 281–283.

*Primary Examiner*—Edward F. Urban

[57] ABSTRACT

A communication system that provides dual frequency communication using a single superheterodyne receiver that receives both the desired frequency and the image frequency of a transmitted signal. If communication cannot be established on a desired frequency, the transmitter switches to the image frequency while the receiver frequency remains constant.

11 Claims, 4 Drawing Sheets

COMMUNICATION DIVERSITY BY IMAGE RECEPTION

BACKGROUND OF THE INVENTION

This invention relates to communication systems which use electromagnetic (EM) energy and a superheterodyne receiver to communicate information.

In communication systems which use electromagnetic energy to communicate information, reflection of the electromagnetic signals off of structures, indoors and outdoors, can cause signal multipath fading which can degrade communications. Various methods have been devised to mitigate multipath fading and they have invariably added to the complexity of the receiver.

Multipath fading is a condition in which an electromagnetic (EM) signal reaches the receiving antenna over two or more paths of different lengths. It occurs when a building or similar structure reflects a portion of the signal. When the reflected signal arrives at the receiving antenna, its phase slightly lags the phase of the signal traveling directly from the transmitting site to the receiving antenna. This results in loss of signal power and signal distortion. The effect of multipath fading can often be mitigated by switching to another frequency.

To mitigate multipath fading, two superheterodyne receivers have been used in a single unit to provide the means for receiving a signal transmitted on a second frequency. The dual frequency superheterodyne receiver comprises two single superheterodyne receivers that are combined in a single receiver. If communication cannot be established on a first frequency using the first superheterodyne receiver, the transmission is switched to the second frequency and an attempt is made to establish communication with the second superheterodyne receiver. The disadvantage of dual frequency superheterodyne receivers is that two single superheterodyne receivers have to be used. This increases the cost of the receiver as well as its size, which is often critical in miniaturized devices.

The superheterodyne receivers known in the prior art make use of the heterodyne principle of mixing an incoming signal with a signal generated by a local oscillator in a nonlinear element called a mixer. The mixing yields a new signal having an intermediate frequency which is the difference or sum of the local oscillator and the incoming signal frequencies. Tuning of the receiver is affected by varying the local oscillator frequency, thereby changing the frequency of the incoming signal which when mixed with the local oscillator signal, will yield a signal at a fixed intermediate frequency.

A disadvantage of the superheterodyne receiver is that incoming signals having a frequency higher or lower than the local oscillator frequency and differing from the local oscillator frequency by the intermediate frequency, either positively or negatively, will mix to yield signals at the intermediate frequency. This is known as the reception of the "image" or "image frequency interference". Several methods are used to partially overcome image frequency interference, such as, the use of a higher intermediate frequency and filtering the signal before the mixer.

The image frequency in a superheterodyne receiver is eliminated by tuned circuits located either before the mixer or following the heterodyne process. The signal resulting from the mixing of the desired frequency and the local oscillator signal, referred to as the intermediate frequency, is passed on for further amplification and, what is more important, through stages of high selectivity because selectivity at lower frequencies is more easily obtained than at high frequencies.

The new intermediate frequency (IF) signal, derived from the modulated carrier frequency and an unmodulated local oscillator frequency, is modulated to the same degree as the original carrier.

The intermediate frequency (IF) in prior art superheterodyne receivers is designed to be high enough so that little response is obtained to the so-called image frequency, which is an incoming (but undesired) radio frequency signal whose difference from the local beating oscillator is the same as the desired signal. The image signal differs from the desired signal by twice the intermediate frequency, so that the preselection filtering required at the signal frequency can be much broader than if the filtering of adjacent channel signals was required. An example of this is a desired signal of 1000 kHz and a local oscillator of 1500 kHz beating to obtain an intermediate frequency of 500 kHz. The image frequency of 2000 kHz, if unblocked by a filter or preselector, will cause interference by developing the same difference of 500 kHz when beating with the 1500 kHz local oscillator.

Local oscillators used in superheterodyne receivers require careful design. Assuming that the transmitted signal is kept within narrow limits of frequency tolerance, the local oscillator must keep the resultant intermediate frequency at the center of the pass band of the amplifier.

The narrower the pass band of the amplifier—that is, the greater its selectivity—the more important it is that the local oscillator does not vary in frequency. This is difficult in receivers which must be tuned by an operator so that one of several signals may be selected at will. In dual-detection superheterodynes the second oscillator may be accurately controlled in frequency by a piezoelectric quartz crystal, such as that used to maintain radio transmitters on their assigned frequencies.

SUMMARY OF THE INVENTION

1. Objects of the Invention

Accordingly, it is the general object of the present invention to overcome the aforementioned drawbacks of the prior art.

Another object of the present invention is to provide a communication system using a dual frequency superheterodyne receiver that is less susceptible to signal multipath fading.

Still another object of this invention is to provide a communication system using a dual frequency single superheterodyne receiver that uses one local oscillator.

A further object of this invention is to provide a communication system using a dual frequency single superheterodyne receiver in which the transmitter frequency is automatically switched.

Another object of this invention is to provide a communication system using a dual frequency single superheterodyne receiver in which the transmitted frequency is automatically switched to a secondary frequency after a preselected number of unsuccessful attempts to transmit on a primary frequency.

Yet another object of this invention is to provide a communication system using a dual frequency single superheterodyne receiver in which the receiver communicates with the transmitter.

Still another object of this invention is to provide a communication system using a dual frequency single superheterodyne receiver in which a failure signal is generated if a message cannot be received over either of the dual frequencies.

2. Features of the Invention

In keeping with these objects and others which will become apparent hereinafter, one feature of the invention resides in the utilization of a communication system having a superheterodyne receiver without image frequency filtration at the receiver input, and novel method of receiving an electromagnetic signal at a desired frequency and also a second signal at the image frequency of the desired frequency. The communication system includes a means for acknowledging the reception of the signal to the transmitter that sent the signal. When the superheterodyne receiver cannot clearly receive the electromagnetic signal because of multipath fading, the transmission frequency of the transmitter is switched to the image frequency and thus, provides a means of dual frequency communication using a single superheterodyne receiver. The electromagnetic signal is usually a radio signal but it can also be a video signal.

The communication system is set to communicate using a desired frequency and when a signal is transmitted at the desired frequency the superheterodyne receiver determines if the quality of the signal is sufficient for successful communication. If the signal transmitted on the desired frequency is received at a level determined to be required for successful communication, the receiver transmits an acknowledgement signal to the transmitter and communication continues on the desired frequency. If the signal transmitted on the desired frequency is not received at a level determined to be required for successful communication, the acknowledgement signal is not sent from the receiver to the transmitter. When the transmitter does not receive the acknowledgement signal after a predetermined period of time, it will retransmit the signal on the desired frequency. The transmitter continues to retransmit the signal on the desired frequency until an acknowledgement signal is received or, after a predetermined number of attempts to transmit the signal on the desired frequency, the transmitter switches to the image frequency. The signal is transmitted on the image frequency and the superheterodyne receiver determines if the quality of the signal is sufficient for successful communication. If successful communication is established for transmission on the image frequency, the receiver transmits an acknowledgement signal to the transmitter.

Another feature of the invention is the continuous monitoring of the transmitted signal quality by the superheterodyne receiver. During the communication, if the quality of the transmitted signal falls below the level required for successful communication, a signal is sent from the superheterodyne receiver to the transmitter indicating that the transmitted signal cannot be received. The signal is then retransmitted until an acknowledgement signal is received from the superheterodyne receiver or the transmission frequency is switched.

Still another feature of the invention is the automatic switching from the transmitted frequency to the secondary frequency. The secondary frequency is defined as the signal frequency not in use when the transmitter is transmitting on either the desired frequency or the image frequency. Thus, when the desired frequency is being used for transmission, the secondary frequency is the image frequency and when the image frequency is being used for transmission, the secondary frequency is the desired frequency. The communication system counts the number of attempts that are made to establish communication when a signal is transmitted. If an acknowledgement signal is not received by the transmitter after a predetermined number of attempts, the transmitter automatically switches to the secondary frequency and attempts to establish communications with the superheterodyne receiver.

Yet another feature of the invention is the generation of an error signal if the transmitter is unable to establish communication with the superheterodyne receiver on either the desired frequency or the image frequency after a predetermined number of attempts.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
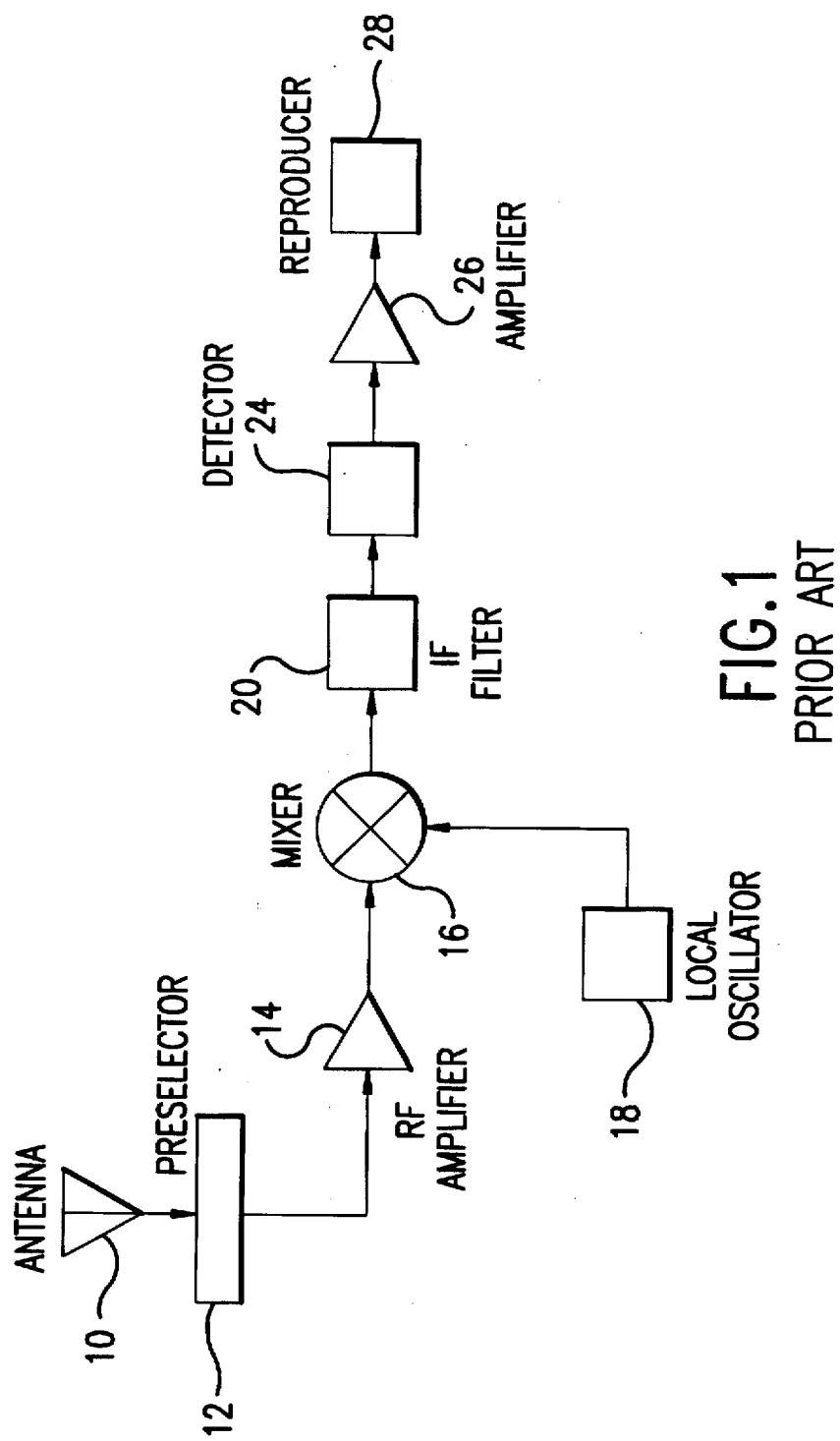
FIG. 1 is a block diagram of a typical prior art superheterodyne receiver.

Referring now to FIG. 1 of the drawings, the block diagram shows a typical superheterodyne receiver. The basic idea of the superheterodyne is to convert the radio frequency (RF) carrier signal to a lower frequency where it can be amplified and otherwise processed. The transmitted radio signal is received by the antenna 10 and sent to a preselector 12 which discriminates against unwanted signals. The signal is then amplified in an amplifier 14 before it is mixed in the mixer 16 with a signal generated by the local oscillator (LO) 18. The output signal from the mixer 16 is at an intermediate frequency (IF) and it is filtered in an IF filter 20 and then amplified in the IF amplifier 22 before it is sent to the detector 24. The detector-operates at the intermediate frequency and demodulates the intermediate frequency to recover the transmitted data.

The superheterodyne receiver makes use of the heterodyne principle of mixing an incoming signal with a signal generated by a local oscillator 18 in a nonlinear element. However, rather than synchronizing the frequencies, the superheterodyne receiver uses a local oscillator frequency offset by a mixed intermediate frequency from the desired signal. Since the mixer 16 is a nonlinear device that generates a difference frequency that is identical if the signal frequency is either above or below the local oscillator frequency, it is necessary to provide the preselector 12 or some other filtering means to suppress the undesired signal. This undesired signal is the image frequency and the preselector 12 prevents the image frequency from being received by the detector 24.

Figure 2:
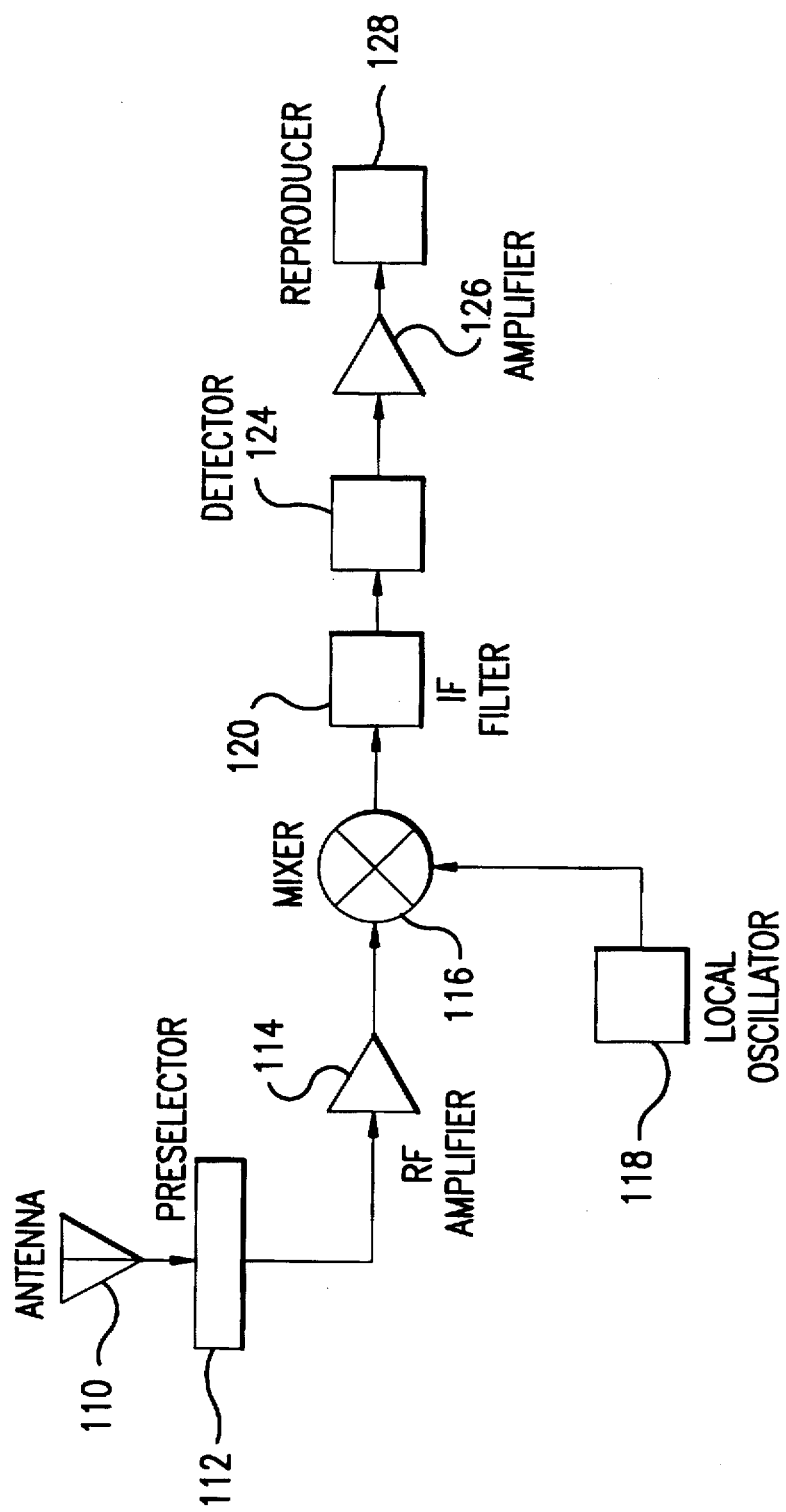
FIG. 2 is a block diagram of the superheterodyne receiver in accordance with this invention.

FIG. 2 of the drawings shows the block diagram for the superheterodyne receiver of this invention. A radio signal is received by the antenna 110 and sent to the preselector 112. In the present invention, the preselector 112 does not filter out the image frequency. The signal is then passed to the frequency amplifier 114. The amplified signal is then mixed with a preselected signal generated by the local oscillator (LO) 118 in the mixer 116. The output of the mixer 116 is at an intermediate frequency (IF) and it is filtered by the IF filter 120 before being sent to the detector 124. The detector 124 demodulates the IF signal to recover the video or audio and the recovered video frequency (VF) or audio frequency (AF) signal is sent to an amplifier 126 and then to the reproducer 128. When the receiver is being used for the reception of computer generated signals, the demodulated IF signal can be sent directly to a computer.

It has been surprisingly found that the superheterodyne receiver circuit can by used as a dual frequency receiver to receive radio signals of both the desired frequency (DF) and the image frequency (Fi). When either the desired frequency or its image frequency is mixed with the signal generated by the local oscillator 118 in the mixer 116, the same intermediate frequency output signal will be produced. Other spurious signals can also be generated when there is no radio signal being received or when the local oscillator has been turned off. However, these signals can be filtered out by the preselector 112.

A desired frequency (DF) and its image frequency (Fi), have the following relationship to the intermediate frequency (IF):

$$DF = LO - IF \tag{1}$$

$$Fi = Lo + IF \tag{2}$$

or it can be expressed as:

$$IF = LO - DF \tag{3}$$

$$IF = Fi - LO \tag{4}$$

and $$Fi - DF = (LO - IF) - (LO + IF) = 2\ IF \tag{5}$$

EXAMPLE I

A radio signal is transmitted at a desired frequency (DF) of 2000 megahertz (MHz) to a superheterodyne receiver having a local oscillator signal of 2500 MHz and an intermediate frequency determined by the difference according to equation (3):

$$IF = LO - DF$$
$$IF = 2500 - 2000$$
$$= 500\ MHz$$

The image frequency (Fi) is calculated using equation (2):

$$Fi = LO + IF$$
$$Fi = 2500 + 500$$
$$= 3000\ MHz$$

Thus, when an image frequency of 3000 MHz is received, it will provide the same IF as the desired frequency. This can be shown using equation (4):

$$IF = FI - LO$$
$$IF = 3000 - 2500$$
$$= 500\ MHz$$

The present invention uses the image frequency as a secondary broadcast signal frequency when communication cannot be established on the desired frequency. In the example above, if there is multipath fading for the desired frequency of 2000 MHz, the transmission is switched to the image frequency of 3000 MHz. Because the intermediate frequency for both the desired frequency and its image frequency are the same, a single superheterodyne receiver can be used without changing the values of the local oscillator (LO) or intermediate frequency (IF) when the transmission frequency is switched. This avoids the need to reset the receiver frequency setting or for providing a second receiver circuit.

Figure 3:
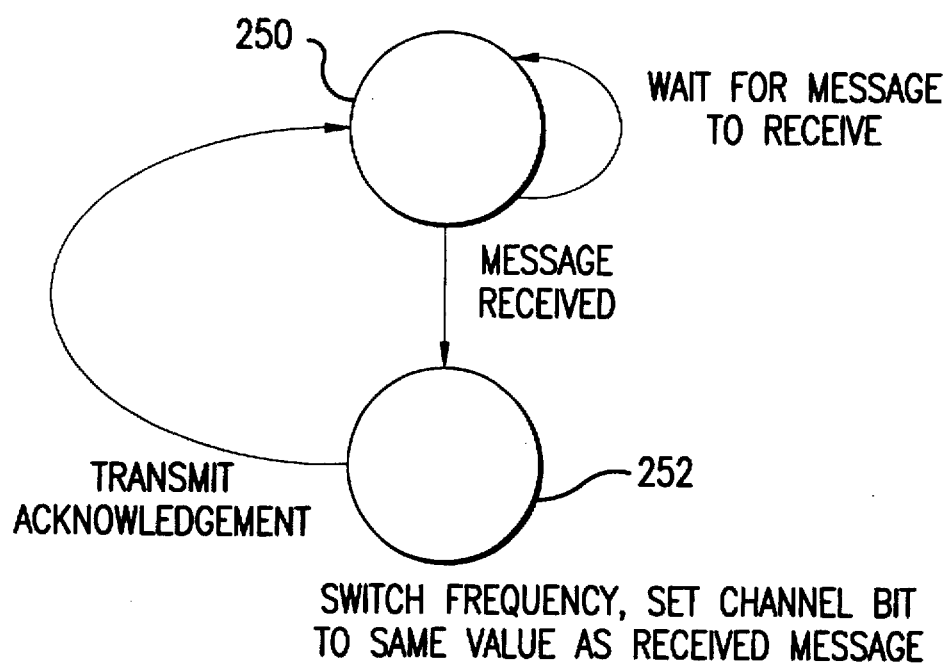
FIG. 3 is a state diagram for the acknowledgement of a message received by the superheterodyne receiver.

In a preferred embodiment of the invention, the superheterodyne receiver acknowledges that it has received a message by transmitting an acknowledgement signal to the transmitter. FIG. 3 shows the state diagram for the acknowledgement of the transmitted signal. Transmitter 250 sends a signal to the superheterodyne receiver 252 on either the desired frequency (DF) or the image frequency (Fi). The frequency used is indicated by information contained in the transmitted signal. In a preferred embodiment, the information is a digital bit. If the transmission is received at a level suitable for communication, the superheterodyne receiver 252 transmits an acknowledgement signal to the transmitter 250 on the same frequency used by the transmitter 250. The acknowledgement signal permits the transmitter 250 to continue to transmit and acknowledges that the signal is being received. If the acknowledgement signal is not received after a predetermined period of time, as measured by a timing means or timer, the transmitter 250 will retransmit the signal at the same frequency.

In a preferred embodiment of this invention, the transmitter 250 is programmed to retransmit a signal a predetermined number of times on the selected frequency. If an acknowledgement signal is not received after the predetermined number of attempts, the frequency is switched to the secondary frequency. The transmitter 250 transmits on the secondary frequency and continues to transmit on the secondary frequency if the acknowledgement signal is received. If the acknowledgement signal is not received after a predetermined period of time as measured by a timing means or timer, the transmitter 250 will retransmit the signal at the same frequency. If the acknowledgement signal is not received after a predetermined number of attempts, the transmitter 250 switches to the primary frequency, that is the first frequency that was used.

Figure 4:
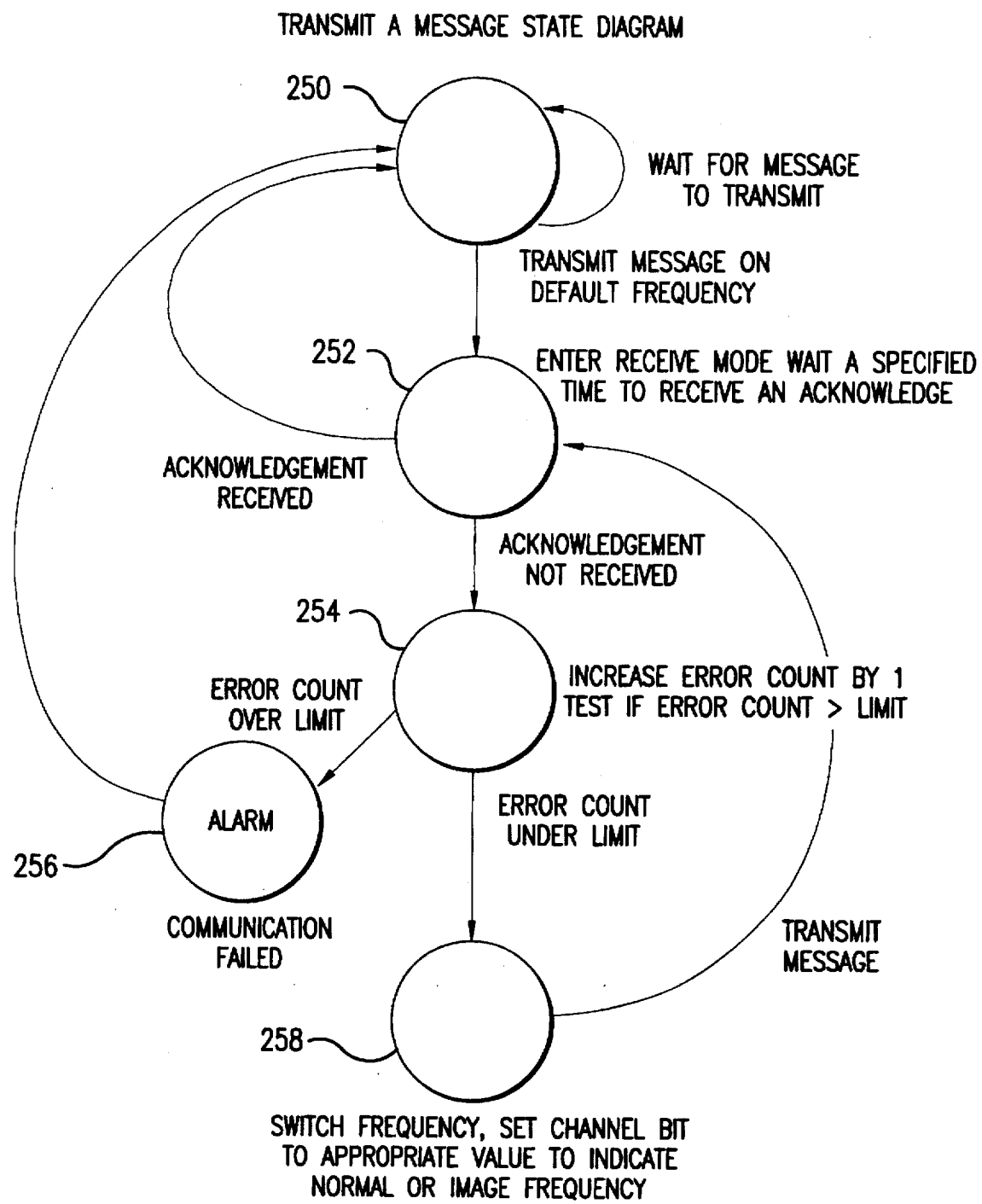
FIG. 4 is a state diagram for retransmitting a message if an acknowledgement is not received and generating an error signal if the message is not received after a predetermined number of attempts.

FIG. 4 shows the state diagram for the operation of the superheterodyne transmitter in accordance with the present invention. The transmitter 250 transmits a signal to the superheterodyne receiver on the default frequency which is also known as the desired or primary frequency. The frequency used by the transmitter 250 is determined by information contained in the transmit signal, i.e. the signal which commands the transmitter 250 to transmit. The transmitter 250 continues to transmit for a pre-determined period of time. After this predetermined period of time, the transmitter 250 will continue to transmit if it has received an acknowledgement signal from the receiver 252. If an acknowledgement signal is not received, a counter 254 will add a count. If the count is under a predetermined limit, a signal will be sent to a switch 258 that changes the transmitter frequency to the secondary frequency. The transmitter will retransmit the signal at the secondary frequency, which is the image frequency, and the counter 254 will add a count. If the count on the counter 254 is over the predetermined limit, a failure alarm 256 is actuated. The signal is transmitted at the secondary frequency for a predetermined period of time, after which it will either continue to transmit if an acknowledgement signal has been received from the receiver 252 or, if an acknowledgement signal has not been received, the receiver 252 will switch to the default frequency, retransmit the signal and add a count to the counter 254. The transmitter 250 will continue to alternate between the default frequency and the secondary frequency until communication has been established or the counter reaches a predetermined number of counts, and the alarm 256 is actuated.

It will be understood that each of the elements described above, or two or more together, may also find a useful application in other types of constructions differing from the types described above.

While the invention has been illustrated and described as embodied in a communication system comprising a superheterodyne receiver for receiving transmitted signals on a desired frequency and its image frequency, and a means for switching from one frequency to the other if the reception of the signal is not acknowledged, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What we claim is:

1. An image frequency interference eliminating communication system for selective dual frequency transmission of a radio signal over a transmission frequency, said system comprising:

a transmitter for transmitting said radio signal over a transmission frequency selected from a set of two transmission frequencies comprising a desired transmission frequency and an image transmission frequency, said image transmission frequency and said desired transmission frequency being separated such that they can be downconverted to the same intermediate frequency; and a single superheterodyne receiver having a filter for passing said desired and image transmission frequencies, said receiver using a local oscillator frequency for downconverting either the desired transmission frequency or the image transmission frequency for producing said intermediate frequency, wherein both the desired frequency and its image frequency are used for communication.

2. The communication system of claim 1, wherein said superheterodyne receiver is provided with a means for acknowledging that a transmission is successfully received.

3. The communication system of claim 2, wherein said means for acknowledging that a transmission is successfully received is a second signal sent from said receiver to said transmitter.

4. The communication system of claim 1, wherein said superheterodyne receiver comprises an antenna, an input signal amplifier, a local oscillator, a mixer, an intermediate frequency filter and a detector.

5. The communication system of claim 1, wherein said transmitter is provided with a means for switching transmission frequencies.

6. The communication system of claim 5, wherein said transmitter frequency is switched after a period of time if a signal acknowledging reception of said signal is not received.

7. The communication system of claim 1, wherein said transmitter is provided with a timing means for measuring the elapsed time of a transmission.

8. A communication system for dual frequency transmission of a radio signal, said system comprising:

a transmitter for transmitting said radio signal over a transmission frequency selected from a set of two transmission frequencies comprising a desired transmission frequency and an image transmission frequency, said image transmission frequency and said desired transmission frequency being separated such that they can be downconverted to the same intermediate frequency, said transmitter further provided with a means for switching frequencies after a period of time if a signal acknowledging reception of said signal is not received, wherein a counting means counts the number of times that said transmitter frequency is switched; and a single superheterodyne receiver having a filter for passing said desired and image transmission frequencies, said receiver using a local oscillator frequency for downconverting either the desired transmission frequency or the image transmission frequency for producing said intermediate frequency;

wherein the switching frequencies are both said desired frequency and said image frequency used for communication.

9. The communication system of claim 8, wherein an alarm actuates after the counting means is equal to a predetermined number of counts.

10. An image frequency interference eliminating communication system for selective dual frequency transmission of an electromagnetic signal, said system comprising:

a transmitter for transmitting said electromagnetic signal over a transmission frequency selected from a set of two transmission frequencies comprising a desired transmission frequency and an image transmission frequency, said image transmission frequency and said desired transmission frequency being separated such that they can be downconverted to the same intermediate frequency;

a single superheterodyne receiver having a filter for passing said desired and image transmission frequencies, said receiver using a local oscillator frequency for downconverting either the desired transmission frequency or the image transmission frequency for producing said intermediate frequency;

a means for switching said transmitter between the two transmission frequencies;

a signal transmission timer;

a counter; and an alarm;

wherein both said desired transmission frequency and said image transmission frequency are used for communication.

11. The communication system of claim 10, wherein said electromagnetic signal is a radio signal.

* * * * *